United States Patent [19]

Fouss et al.

[11] 4,254,885
[45] Mar. 10, 1981

[54] SUBTERRANEAN PLASTIC TANK

[75] Inventors: James L. Fouss; John J. Parker, both of Findlay; Donald A. Lytle, Tiffin, all of Ohio

[73] Assignee: Hancor, Inc., Findlay, Ohio

[21] Appl. No.: 12,019

[22] Filed: Feb. 14, 1979

[51] Int. Cl.³ ............................................. B65D 6/38
[52] U.S. Cl. .................................. 220/72; 220/5 A; 220/83
[58] Field of Search ............... 220/72, 5 A, 1 B, 74, 220/83

[56] References Cited

U.S. PATENT DOCUMENTS

| 951,556 | 3/1910 | Bossingham | 220/72 X |
|---|---|---|---|
| 2,963,191 | 12/1960 | Setzekorn et al. | 220/5 A X |
| 3,583,623 | 6/1971 | Golner et al. | 220/72 X |

OTHER PUBLICATIONS

Wedco, La Fosse Septique en Polyethylene.
Wedco, Septic Tank, 1-750.0.
Fiber Erectors, The Modern, Lightweight Sewage System.
Soltralco, Ensembles d'Assainissement Eparation.
HBA Cast Products Co., Check The Advantages of HBA's Fiberglass Septic Tanks.

Primary Examiner—Steven M. Pollard
Attorney, Agent, or Firm—Fay & Sharpe

[57] ABSTRACT

A thin-walled, one-piece plastic tank for subterranean storage and transmission of sewage or other materials. The tank comprises a bottom wall, an arched top wall and opposed end walls. The top wall is substantially semi-circular in cross-section with a plurality of corrugations therearound. Along the apex area of the arch is a pair of manhole-like openings with an arced strengthening rib therebetween. The bottom wall is generally arced in cross-section with a radius very large compared to the radius of the cross-section of the top wall which causes the bottom wall to be generally flat. The end walls are arced in the longitudinal, cross-sectional and horizontal planes. The end walls each have a plurality of corrugations. In the root of one of the corrugations is a depression which contains a horizontal aperture for the egress or ingress of fluid materials. The bottom wall has a plurality of corrugations mating with the top wall corrugations such that the corrugations circumscribe the tank. Further, the bottom wall has a pair of regions one adjacent each end wall which contain a plurality of triangular indentations in a truss-like configuration.

49 Claims, 8 Drawing Figures

SUBTERRANEAN PLASTIC TANK

BACKGROUND OF THE INVENTION

This application pertains to the art of fluid reservoirs and, more particularly, to the art of plastic tanks. The invention is particularly applicable for septic tank use and will be described with particular reference thereto, although it will be appreciated that the invention has broader applications such as subterranean storage of petroleum fuels, powdered chemicals, grain, or other fluid and non-fluid products.

Subterranean tanks for septic use have heretofore been constructed primarily of concrete although concrete block, fiberglass and steel tanks also have been used. For petroleum and fluid storage, fiberglass and steel tanks are used primarily. Such tanks are generally prefabricated. However, such tanks are, in some instances, fabricated on the installation site.

Septic tanks are commonly rectangular prisms of precast concrete. Near the top on one vertical end wall is an inlet for raw storage; near the top, on the opposite end wall is an outlet which permits treated fluids to pass to the septic field. Generally, there is an access opening in the top for removing accumulated solid materials which have settled to the tank bottom. To install the precast tanks, an excavation is made of sufficient size and depth that the outlet of the tank will be generally in the plane of the septic field. A hoist, often located on a transporting vehicle, is used to lower the tank into an excavation.

One of the principal problems with installing the prior art tanks in this manner, especially prefabricated concrete septic tanks, is the large weight. Installation is limited to firm, generally level ground able to support the heavy equipment necessary to lift and lower such tanks.

Another problem with the prior tanks has been flotation. In situations in which the ground water becomes high, the tanks tend to become bouyant. This bouyancy may cause the tank to shift vertically or even pop out of the ground.

Prior attempts to produce plastic subterranean tanks have failed to achieve successful products. Plastic tanks tend to be more expensive than their concrete, fiberglass, or steel counterparts unless the tanks are made very light weight. However, the prior art light weight tanks failed to achieve the strength required to prevent the tank from collapsing under subterranean soil loads.

SUMMARY OF THE INVENTION

The present invention contemplates a new and improved tank which overcomes all of the above-referenced problems and others. It provides a light weight plastic tank which is cost and strength competitive with prior art devices.

In accordance with the present invention, there is provided a thin-walled plastic tank having a bottom wall, an arched top wall, and opposed end walls. The top wall has an arched cross-section with corrugations longitudinally therealong. The bottom wall, which is generally flat or slightly convex, is joined with the top wall so as to close its arched cross-section. The end walls are curvilinear wall portions which diverge from each other toward the bottom wall of the tank. At least one conduit or aperture is formed as a structural part of the tank to allow ingress and egress of fluid material.

In accordance with another aspect of the invention, the cross-section of the corrugations along one or more of the apex of the arched top wall and the two edge areas where the top and bottom walls merge are modified to provide greater axial strength. The corrugation modification may include a reduction in corrugation depth, elimination of the corrugation, or a lateral rib axially along the tank.

In accordance with a more limited aspect of the invention, there is provided a truss-like series of indentations in the bottom wall adjacent the area in which the bottom wall and each end wall merges.

In accordance with a still more limited aspect of the invention, there is provided corrugation cross-sectional design which maximizes the strength to plastic material ratio in a rotational moding process.

A principal advantage of the invention is its light weight with great strength in both the axial and radial directions.

Another advantage of the invention is a reduction in the tendency toward floatation.

Yet another advantage of the present invention is reduced installation costs.

Still another advantage of the invention is its watertight design in both the tank body and at inlet and outlet connections.

Further advantages of the present invention will become apparent to those reading and understanding the present disclosure.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

Figure 1:
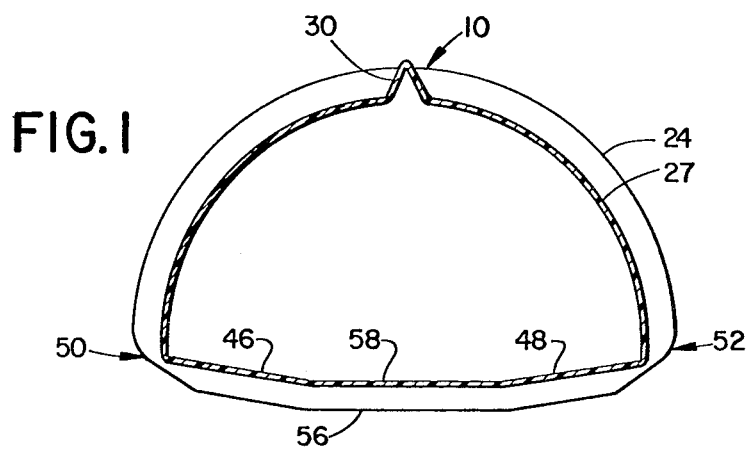
FIG. 1 is a cross-section along section line 1—1 of FIG. 3.

Referring now to the drawings wherein the showings are for purposes of illustrating a preferred embodiment of the invention only and not for the purpose of limiting it. The Figures show a corrugated plastic tank for underground storage and transmission of fluid or semi-fluid materials, especially sewage materials. The tank comprises a corrugated top wall A which is arched in cross-section and a bottom wall B which closes the arched cross-section. The top and bottom wall combination form a generally tubular structure which is closed on its ends by a pair of curvilinear end walls C and D. The tank defined by the top, bottom and two end walls forms a generally quonset hut-shaped tank. Access means E allows access to the interior of the tank for the ingress and egress of fluid material and, in the preferred embodiment, for the cleaning and removal of excess sedimentation from the tank.

The top wall A is elongated along the longitudinal axis of the tank, and transverse to the longitudinal axis is generally arched in cross-section, as illustrated in FIG. 1. The top wall has an apex area 10 parallel to the longitudinal axis along the top of the arched cross-section. In the preferred embodiment, the arched cross-section is substantially semi-circular. This semi-circular cross-section causes the tank to be relatively short in height compared to like-volume rectangular and cylindrical tanks. This lesser altitude allows the tank to be buried shallower than the prior art tanks. With the shallow placement, a higher level of ground water is required before there are any buoyant or floatation forces. An added benefit of the relatively small cross-sectional area of the semi-circular tank is a reduction in compressive force from end loading of the tank because compressive forces are a function of the cross-sectional area.

The top wall has a central portion 12 and oppositely disposed end portions 14 and 16. The top wall central portion is arched along the longitudinal axis of the tank which increases strength to end loading. The end portions are substantially linear along the longitudinal axis. Opposed arcuate side wall portions 18 and 20 merge at apex area 10 to form the top wall.

Figure 3:
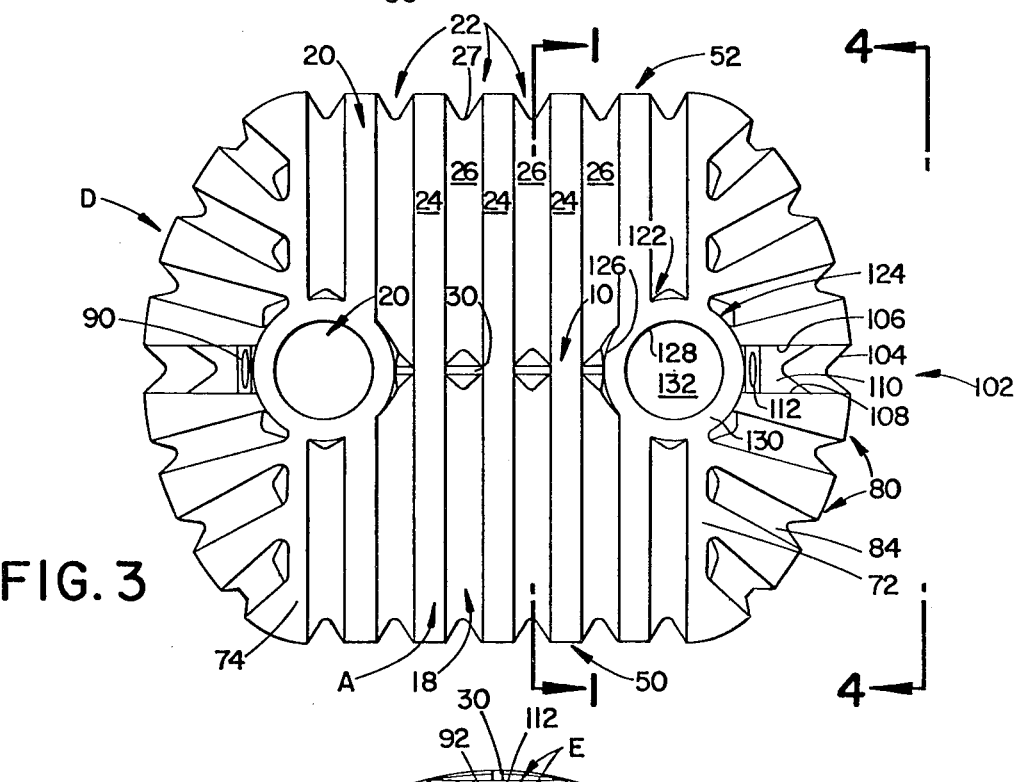
FIG. 3 is a top view of a tank embodied in FIG. 2.
Figure 4:
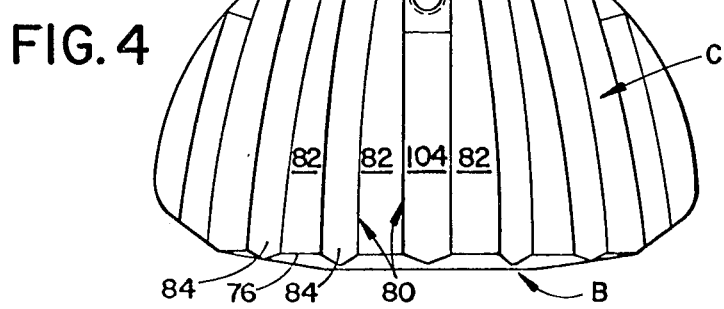
FIG. 4 is an end view of the tank embodied in FIG. 2.
Figure 2:
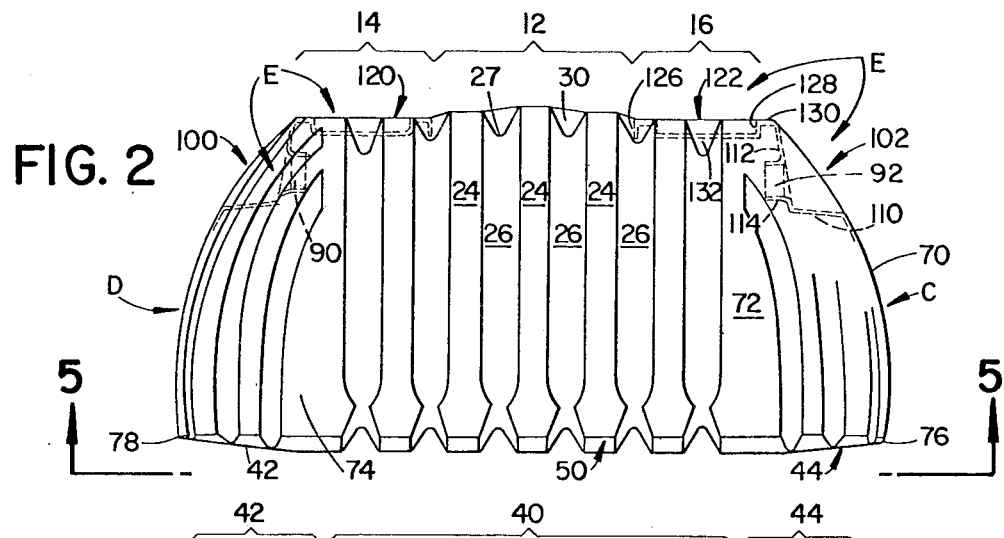
FIG. 2 is a side view of a tank in accordance with the present invention.

As shown more clearly in FIGS. 2 and 3, top wall A has a first plurality of corrugations 22 laterally spaced apart from each other and extending generally transverse to the longitudinal axis of the tank. Each of the corrugations 22 is composed of a crown portion 24 and root portion 26. These corrugations increase the strength of the tank relative to radial compressive forces. The radial forces, such as from hydrostatic loading, tend to compress the tank. If the tank is too weak, it will deform. Deformation modifies the cross-sectional shapes of the walls and corrugations further weakening the tank. Ultimately, a deformed tank may collapse.

Figure 7:
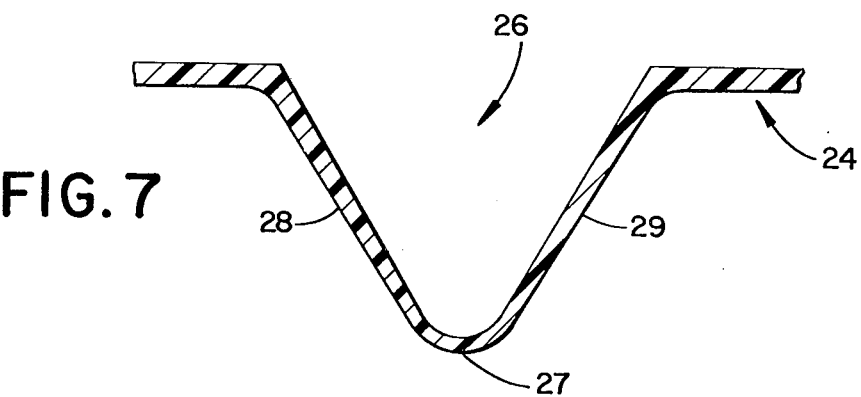
FIG. 7 is an illustrative of the cross-section of the corrugations.
Figure 8:
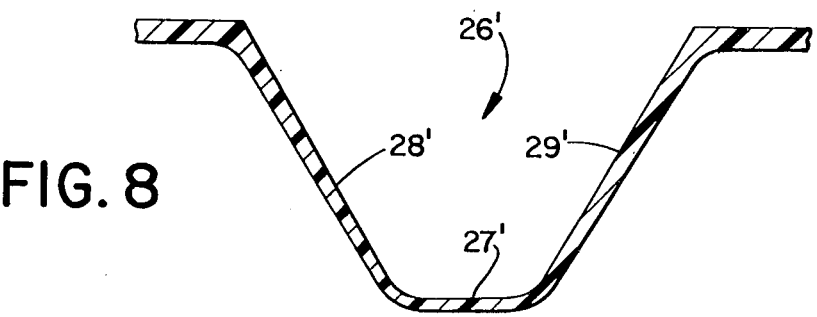
FIG. 8 is an alternate embodiment of the cross-section of the corrugations.

As illustrated in FIG. 7, the roots of the preferred embodiment are generally V-shaped. The lowest point or bottom 27 is rounded with a relatively large radius of curvature. The sides 28 and 29 diverge at generally 60° forming a cross-section shaped like an equilateral triangle. The dimensions of the corrugations will vary with the size of the tank. However satisfactory dimensions for a 500-gallon tank have been found to be a root depth of three and a half inches and a radius of curvature at the bottom of five eighths of an inch. Suitable wall thicknesses for the crowns and roots are about a quarter inch, but the thickness along the bottom radius of curvature may be less such as about a sixth of an inch. An alternate embodiment of the roots is illustrated in FIG. 8. In this embodiment, the generally V-shaped cross-section is truncated to form a substantially flat bottom 27' of the root. The flat bottom merges with rounded arcuate sections of relatively large diameter into sides 28' and 29'.

Along the apex area of the top wall, parallel to the longitudinal axis, is an axial rib 30. This rib provides rigidity to resist end loading forces. To increase the strength of rib 30 relative to top loading forces, it is arced upward along the arc defined by the top wall, central portion.

Figure 5:
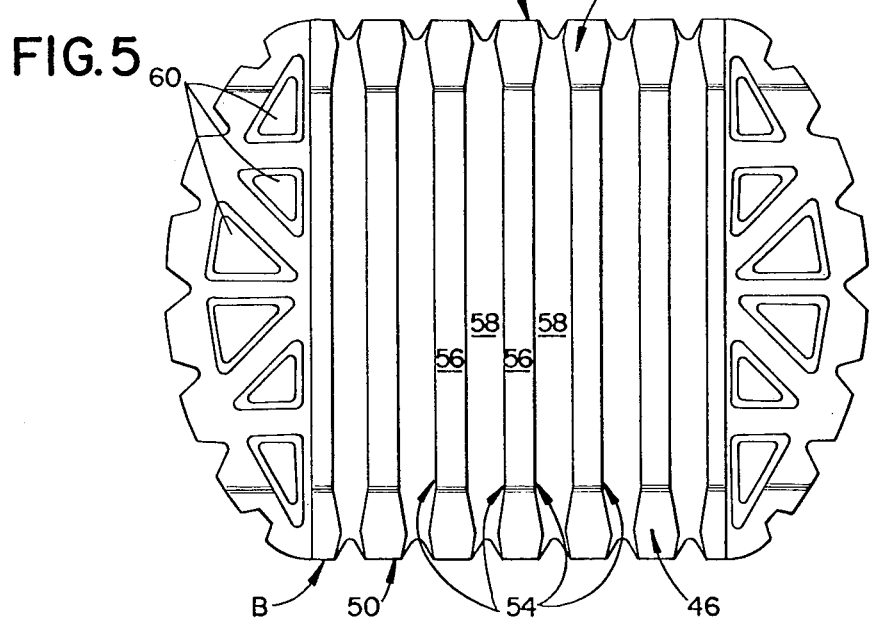
FIG. 5 is a bottom view of the tank embodied in FIG. 2.

Looking to FIGS. 1 and 5, the bottom wall B closes the elongated arch of top wall A. The bottom wall comprises a central portion 40 and opposed along the longitudinal axis is a pair of end portions 42 and 44. Transverse to the longitudinal axis, the bottom wall has opposed side portions 46 and 48. The opposed bottom wall side portions 46 and 48 merge with top wall side portions 18 and 20 at side portion terminal side edge areas 50 and 52.

The strength required of the bottom wall varies with the soil conditions of the installation site. If the earth below the tank is very wet or saturated, then the bottom wall of the tank must resist a generally hydrostatic load, especially if the tank is empty of fluids. Accordingly, the bottom wall of the preferred embodiment is slightly convex such that it forms a generally circular arch of a large radius compared with the radius of the top wall A. Specifically, side portions 46 and 48 arc upward toward the top wall. Similarly, end portions 42 and 44 slant upward to give the bottom wall a generally arced configuration parallel to the longitudinal axis.

The strength of bottom wall B is further increased by a further plurality of corrugations 54 laterally spaced from each other and transverse to the longitudinal axis of the tank. Each corrugation includes a crown portion 56 and a root portion 58. Like the corrugations of the top wall, the roots 58 are generally V-shaped with a cross-section similar to that of an equilateral triangle. The corrugations of the top and bottom walls merge at the side portion terminal side edge areas 50 and 52 in such a manner that the corrugations extend peripherally around the tank.

Longitudinal axial ribs may be formed along the side edge areas 50 and 52 to increase the longitudinal compressive strength of the tank. Because the basic cross sectional shape of the body of the tank as shown in FIG. 1 is an arch, areas 50 and 52 can have very little bending resistance, or in fact be hinged, without significantly reducing the strength of the overall structure. Because large bending resistance is not required at the side edge areas, the corrugations may be reduced in depth. The reduced corrugation depth at these areas forms a type of axial stiffening rib down each side edge area. These axial ribs, if used, and axial rib 30 comprise axial strengthening means.

The bottom wall end portions each contain a plurality of indentations 60. Each indentation is triangular in cross-section. The indentations in each bottom wall end portion are arranged in a truss-like configuration. Each indentation is shaped like a truncated triangular pyramid. The truncation of the pyramid is at a depth commensurate with the depths of roots 58.

Curvilinear end walls C and D have cross-sections in three orthogonal planes that are substantially circular arc segments. Looking to end wall C as exemplary, FIG. 2 shows that it is arcuate in cross-section 70 in the vertical plane which is generally parallel to the longitudinal axis. In the vertical plane transverse to the longitudinal axis, end wall C has an arched cross-section. Similarly, in the generally horizontal plane which is generally parallel with the bottom wall, end wall C is again arched in cross-section.

End wall C merges into the end portion 16 of the top wall along a top end edge area 72. End wall D merges into end portion 14 of the top wall at an opposed top end edge area 74. Similarly, end walls C and D merge into the end portions 44 and 42 of the bottom wall along bottom end edge areas 76 and 78.

To strengthen the end walls, a second plurality of corrugations 80 is formed therein. The corrugations run generally from the top wall to the bottom wall. The corrugation crowns generally diverge as they run from the top wall to the bottom wall. The corrugations intersect the bottom edge area generally normal to the bottom wall. These corrugations increase the strength of the end wall relative to end loading forces. Each of the corrugations 80 has a crown portion 82 and a root portion 84. The roots are again shaped in cross-section generally like an equilateral triangle. The root portions 84 are oriented generally toward a common point on the central axis of the arch defined by bottom end edge area 76.

The access means E includes a generally horizontal access opening in each of the walls C and D. Wall D includes an inlet opening 90 and wall C an outlet opening 92. There is, of course, no structure to limit the directional flow of fluids through these two openings. However, in septic tank installations, it is conventional that the outlet opening be a few inches lower than the inlet opening. Accordingly, as illustrated in FIG. 2, opening 92 is slightly further from the apex area 10 than opening 90.

To help protect and strengthen the connection between the tank and pipe or tubing for carrying egress or ingress fluids, an indentation area 100 is provided around the inlet of end wall D and an indentation area 102 is provided around the outlet area of side wall C. Indentation areas 100 and 102 are essentially mirror images of each other. Accordingly, indentation area 102 will be described in detail, and it will be understood that indentation area 100 is essentially the same. Indentation area 102 is recessed within a central root portion 104 of the corrugations 80. It has a pair of oppposed side walls 106 and 108 spaced apart generally the width of central root portion 104. These side walls are generally parallel and extend along the axis of the tank. Further, the recess is defined by a gently sloping lower wall 110 and a gently sloping back wall 112. Side walls 106 and 108 may converge as they near back wall 112. If they converge to a spacing less than the diameter of the access opening, they may have arcuate depression formed therein. The access opening 92 consists of a tapered cylindrical collar 114 in back wall 112. This collar is designed to achieve a water-tight seal with external plumbing pipe via on O-ring.

The access means E further includes a pair of manhole-like arrangements 120 and 122. Looking to manhole 122 as typical of both, it comprises a raised annular rim 124. The rim is formed by two oppositely disposed side walls 126 and 128. The outer of the side walls 126 merges with back wall 112 of the indented area. A flat surface 130 connects the side walls. The rim is of a height commensurate with the crown of the corrugations 22 of the top wall. It is located substantially in the apex area of top wall A and extends into the top end edge area 72. Recessed within rim 122 is a recessed wall 132. Wall 132 may have one or more access openings therein. Preferably, the access opening consists of an aperture and a reclosable closure means. In septic installations, it is from time-to-time necessary to remove sedimentation from the bottom of the tank. Either manhole 120 or 122 may be used for gaining access for this purpose. Access for this purpose, however, is relatively infrequent. Accordingly, wall 132 may be constructed with a reclosable closure or may be originally constructed as a solid, integral wall. To gain access for cleaning sedimentation, a hole may be cut in wall 132, which hole is resealed after a cleaning operation. For non-septic installations, apertures in wall 132 may be used in addition to or instead of openings 90 and 92 for permitting material ingress and egress from the tank.

Further, if one of the manholes is sufficiently large, the tank may be used for storage of non-fluid materials, air raid shelters, wine cellars, or the like.

Figure 6:
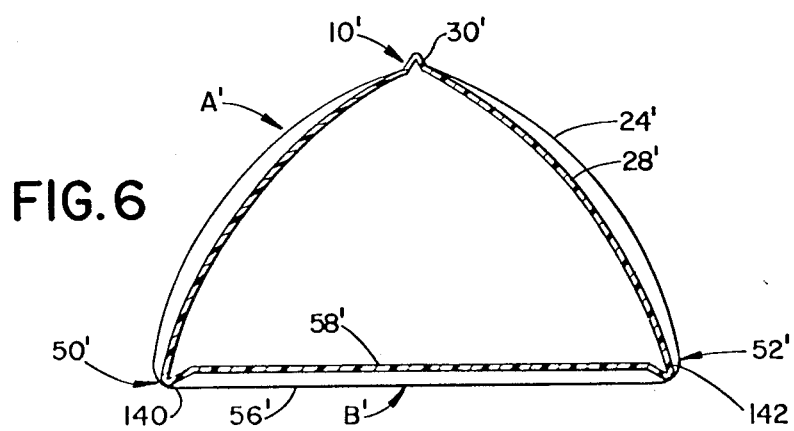
FIG. 6 is illustrative of a cross-section in the same plane as FIG. 1 of an alternate embodiment of a tank in accordance with the present invention.

The cross-sectional shape of the tank in various planes may be modified for various purposes. For example, FIG. 6 illustrates an alternate cross-section of the tank through the same plane as FIG. 1. In this alternate embodiment, elements are marked with the same reference numeral as like elements in FIGS. 1 through 5 followed by a prime (').

Top wall A' has a parabolic cross-section. A parabolic arch is stronger than a semi-circular arch to top loading. Whereas, a semi-circular arch is stronger under hydrostatic loading. Further, for a cross-section of a given area, the altitude of a semi-circular arch is less than of a parabolic arch. Other cross-sections, such as a semi-ellipse, have similar advantages and disadvantages relative to semi-circular and parabolic arches.

As discussed above, the apex and base of the arch are more resistant to deflection than the intermediate regions. Accordingly, the height of the corrugation crowns 24' (or depth of roots 28') in this embodiment is greatest in the intermediate regions.

The axial strengthening means in this alternate embodiment includes axial rib 30' located at the apex area 10' of the arch and axial ribs 140 and 142 located along side edge areas 50' and 52'. The corrugation crowns 56' of bottom wall B' lie in the plane defined by the peaks of axial ribs 140 and 142. The corrugation roots 58' lie along a flat path, but alternately may lie along a convex or concave arc.

The tank may be constructed with various conventional construction techniques. The preferred method of construction is to manufacture the tank in one piece with conventional rotational molding techniques. Instead of a one-piece rotational molding, the tank may be constructed in two or more parts. Smaller parts are easier to handle and transport. A large number of parts, however, adds considerable construction time for assembly and forms many joints which might fail to achieve a water-tight seal.

The corrugations described above are designed to maximize the strength to plastic ratio with inherent plastic distributions produced in rotational molding. Polyethylene is preferred plastic material for constructing the tank; however, other plastic resins such as nylon, polypropylene, ABS, polyurethane, and others may be used. Further, the plastic resins may be reinforced with various types of fillers.

The tank of the preferred embodiment may be any one of a variety of sizes. By way of example, a 500 gallon tank is about 43 inches high, 70 inches wide, and 91 inches long.

To use the tank of the preferred embodiment as a septic tank, reference should be made to the local building codes. An excavation is made for receiving the tank. Gravel and other supporting materials may cover the floor of the excavation to provide a footing for the tank. The depth of the excavation and its location relative to a dwelling is generally prescribed by the local zoning codes. A raw sewage line runs from the dwelling to the inlet 90 of the tank at a slight downgrade for carrying raw sewage thereto. Within the tank, the sewage separates with the solids depositing a sludge layer on the bottom of the tank and grease floating to the surface forming a scum layer. In between the sludge and the scum layers, an area of relatively clear water supports anaerobic biological activity. A baffler is provided adjacent the outlet 92 so that the relatively clear water may pass through the outlet to the exclusion of the scum layer. The outlet is connected to a distribution box from which a plurality of perforate corrugated tile extend to form the disposal field. The size of the tank, again, is usually dictated by local zoning codes. A common size tank for a three-bedroom dwelling occupied by a family of four is 750 gallon tank. About every third year, access is gained through one of the manholes and the accumulated sludge removed.

The invention has been described with reference to the preferred embodiment. Obviously, modifications and alterations will occur to others upon reading and understanding this specification, and when adapting the preferred embodiment to other intended uses. It is our intention to include all such modifications and alterations insofar as they come within the scope of the appended claims or the equivalent thereof.

We claim:

1. A tank comprising:
   a corrugated top wall elongated along a longitudinal axis and having an arched cross-section transverse to said longitudinal axis, said top wall including opposed side portions joined at an apex area;
   A generally flat bottom wall elongated along the longitudinal axis and arranged to close the arched cross-section of the top wall, said top and bottom walls joined at side portion terminal side edge areas, whereby the top and bottom walls form a generally tubular structure;
   opposed curvilinear end walls for closing end openings of the generally tubular structure, said end walls merging with said top wall along top wall end edge areas and joining said bottom wall along bottom wall end edge areas, said bottom wall end edge areas having a generally arched cross-section in a plane generally normal to the arched cross-section of the top wall; and
   access means for allowing access to the interior of the tank.

2. The tank as defined in claim 1 wherein said arched cross-section of the top wall is substantially a semi-circular arch.

3. The tank as defined in claim 2 wherein said bottom wall has a cross-section transverse to the longitudinal axis which is generally an arc segment, the radius of said transverse arc segment being greater than the radius of said semi-circular arch.

4. The tank is defined in claim 3 wherein said bottom wall has a cross-section parallel to the longitudinal axis which is generally an arc segment.

5. The tank as defined in claim 1 wherein said arched cross-section of the top wall is substantially a parabolic arch.

6. The tank as defined in claim 1 wherein said top wall includes a central portion and opposed end portions, the apex area of the central portion having a cross-section parallel to the longitudinal axis which is arced.

7. The tank as defined in claim 6 further including an arced rib disposed along the apex area substantially parallel to the longitudinal axis.

8. The tank as defined in claim 1 further including axial strengthening means for strengthening the tank relative to loading on the end walls.

9. The tank as defined in claim 8 wherein said axial strengthening means includes a rib positioned along the apex area, substantially parallel to the longitudinal axis.

10. The tank as defined in claim 8 wherein said axial strengthening means includes at least one rib positioned generally along at least one of said side portion terminal side edge areas, substantially parallel to the longitudinal axis.

11. The tank as defined in claim 9 wherein said access means includes at least two rims, one located in each top wall end area adjacent the apex area and wherein said rib extends between said rims, at least one of said rims adapted to surround at least one aperture.

12. The tank as defined in claim 1 wherein said bottom wall comprises a central portion and opposed end portions, said central portion having a plurality of laterally spaced corrugations and said bottom wall end portions each having a plurality of spaced indentations spaced for defining a truss-like configuration.

13. The tank as defined in claim 12 wherein said spaced indentations define truncated triangular pyramids.

14. The tank as defined in claim 1 wherein each said end wall has a substantially arched cross-section in a first plane transverse to said longitudinal axis, has a substantially arched cross-section in a second plane generally parallel to said bottom wall, and has an arched cross-section in a third plane generally normal to said first and second planes.

15. The tank as defined in claim 14 wherein, said end walls have a plurality of spaced corrugations, said corrugations arranged generally normal to the bottom wall, said corrugations diverging toward the bottom wall.

16. The tank as defined in claim 1 wherein at least one of said end walls includes an indentation area and wherein said access means includes an aperture within said indentation area.

17. The tank as defined in claim 16 wherein said end walls have a plurality of spaced corrugations arranged generally normal to said bottom wall, each corrugation consisting of a crown portion and a root portion.

18. The tank as defined in claim 17 wherein said indentation area is recessed within one of said root portions.

19. The tank as defined in claim 18 wherein said indentation area includes a lower wall connected with said one root portion, a back wall connected with said lower wall and oppositely disposed side walls connected with said lower wall, said back wall, and crown portions of adjacent corrugations.

20. The tank as defined in claim 19 wherein said access means includes at least one rim disposed at least partially in said apex area of the top wall and at least one aperture circumscribed by said rim.

21. The tank as defined in claim 19 wherein said aperture is defined by a generally cylindrical collar extending through said back wall.

22. The tank as defined in claim 21 wherein said cylindrical collar is adapted to receive an external tubing element having an O-ring therearound, whereby the external tubing frictionally engages and seals with the collar.

23. The tank as defined in claim 17 wherein both of said end walls included indentation areas with apertures therein and wherein the aperture in one of said end walls is disposed further from the bottom wall than the aperture in the other of said end walls whereby the higher altitude of the one aperture assists in restricting its use to ingress of fluids.

24. The tank as defined in claim 20 wherein said rim is disposed at least partially in said top wall end edge area and said back wall is connected with said rim.

25. The tank as defined in claim 1 wherein the corrugations of the top wall comprise raised crown portions and recessed root portions, the root portions having a lesser depth adjacent said side portion terminal side edge area.

26. A thin-walled plastic tank for the underground storage of materials, said tank comprising:
a bottom wall, a top wall, and opposed end walls with a longitudinal axis extending between said end walls;
said bottom wall comprising a central portion having opposed side portions extending slightly upward from said central portion and merging into engagement with said top wall at side portion terminal edge areas, said bottom wall further including opposed end portions merging into said end walls at bottom end edge areas;
said top wall having opposed side wall portions which merge into an apex area;
said end walls being oppositely spaced apart a greater distance from each other adjacent said bottom end edge areas than adjacent said top wall apex area;
a plurality of first corrugations laterally spaced apart from each other along said top wall and extending generally transversely across said top wall at least between said side portion terminal side edge areas;
a plurality of second corrugations laterally spaced apart from each other on said end walls and extending generally between said bottom end edge areas and said top wall;
a plurality of spaced indentations in said bottom wall adjacent said bottom end edge areas; and
access means to said tank for allowing ingress and egress of said materials.

27. The tank as claimed in claim 26 wherein said end walls are curvilinear over their extent between both the opposed side wall portions of said top wall and between said top wall and said bottom wall end edge areas.

28. The tank as defined in claim 26 wherein said first and said second corrugations are defined by a plurality of alternating outwardly extending crowns and inwardly extending roots.

29. The tank as defined in claim 28 wherein said roots have a generally V-shaped cross-section.

30. The tank as defined in claim 29 wherein said roots have generally the configuration of an equilateral triangle.

31. The tank as set forth in claim 29 wherein said V-shaped cross-section is rounded at the bottom of the root with a relatively large radius arc segment.

32. The tank as set forth in claim 29 wherein said V-shaped cross-section is truncated adjacent the bottom of the root to form a generally flat bottom of the root with rounded corners.

33. The tank as defined in claim 28 wherein said crowns are generally truncated.

34. The tank as defined in claim 26 wherein said first corrugations extend peripherally around said tank.

35. The tank is defined in claim 26 wherein said access means comprises an access opening in at least one of said end walls, said access opening being located in an indentation area included in a corrugation root.

36. The tank as defined in claim 35 wherein each of said end walls includes an access opening, said access opening being spaced adjacent said top wall apex area.

37. The tank as defined in claim 35 wherein said access opening includes means adapted to receive a tubing member placed in fluid communication with the inside of said tank.

38. The tank as defined in claim 26 wherein said tank further includes at least one top wall opening in the apex area of said top wall and means for selectively opening and closing said top wall opening.

39. The tank as defined in claim 38 wherein said top wall opening is recessed outwardly from the top wall outer surface and further includes a rim, outwardly extending from said top wall, said rim being defined by two opposed side walls and an interconnecting top wall.

40. The tank as defined in claim 26 wherein said spaced indentations have triangular shaped cross-sections.

41. The tank as defined in claim 40 wherein said spaced indentations are spaced for defining a truss-like configuration.

42. A thin-walled plastic tank for the underground storage and transmission of sewage materials, said tank comprising:
a bottom wall, an arched top wall and opposed end walls with a longitudinal axis extending between said end walls;
said bottom wall comprising a central portion having opposed side portions extending from said central portion and merging into engagement with said arched top wall at side portion terminal side edge areas, said bottom wall further including opposed portions merging into said end walls at bottom end edge areas;
said arched top wall having opposed arcuate side wall portions which merge into an apex area;
said end walls being curvilinear between both the opposed side wall portions of said top wall and between said top wall and said bottom wall end edge areas;
a plurality of first corrugations laterally spaced apart from each other along said arched top wall and extending generally transversely across said top wall at least between said side portion terminal side edge areas;
a plurality of second corrugations laterally spaced apart from each other on said end walls and extending generally between said bottom wall end edge areas and said arched top wall, each said corrugation comprising a crown area and a root area; and
an indentation area located adjacent the top wall apex area in a root area of one of said end walls, said indentation area having an access opening therethrough, said access opening being disposed below the crown areas of adjacent corrugations and adapted to receive a tubing member placed in fluid communication with the inside of the tank.

43. The tank as defined in claim 42 further including a second indentation area located adjacent the top wall apex area in a root area of the other of said end walls, said second indentation area having a second access opening therethrough, said second access opening being disposed further from said top wall apex area than the first access opening, said second access opening being disposed below the crown areas of adjacent corrugations and adapted to receive a tubing member for conveying fluid materials from the interior of the tank.

44. The tank as set forth in claim 43 further including a further plurality of corrugations laterally spaced apart from each other along said bottom wall and extending transversely across said bottom wall between said side portion terminal side edge areas, said further corrugations joining said first corrugations whereby corrugations extend peripherally around the tank and a plurality of spaced indentations disposed in said bottom wall adjacent said bottom end edge areas.

45. The tank as defined in claim 44 wherein said tank further includes at least one top wall opening in the top wall apex area comprising a rim defined by two opposed side walls and an interconnecting top wall and an aperture recessed inwardly from the interconnecting top wall.

46. The tank as defined in claim 45 wherein said tank is a one-piece molded structure.

47. The tank as defined in claim 1 wherein said end walls are spaced apart a greater distance from each other adjacent said bottom wall end edge area than adjacent said top wall apex area.

48. The tank as set forth in claim 1 wherein the height from the bottom wall to the apex area is less than the width of the bottom wall between the side portion terminal side edge areas.

49. The tank as set forth in claim 48 wherein said height is generally half said width.

* * * * *